US011880355B2

(12) United States Patent
Brooks et al.

(10) Patent No.: US 11,880,355 B2
(45) Date of Patent: Jan. 23, 2024

(54) SYSTEMS AND METHODS FOR INTEGRATING HETEROGENEOUS COMPUTING SYSTEMS

(71) Applicant: Animal Care Technologies, Denton, TX (US)

(72) Inventors: Jonathan Brooks, Denton, TX (US); David Grant, Denton, TX (US)

(73) Assignee: Animal Care Technologies

( * ) Notice: Subject to any disclaimer, the term of this patent is extended or adjusted under 35 U.S.C. 154(b) by 161 days.

(21) Appl. No.: 17/499,758

(22) Filed: Oct. 12, 2021

(65) Prior Publication Data
US 2023/0116283 A1    Apr. 13, 2023

(51) Int. Cl.
*G06F 16/23*    (2019.01)
*G06F 16/958*    (2019.01)
*G06F 16/955*    (2019.01)

(52) U.S. Cl.
CPC ...... *G06F 16/2379* (2019.01); *G06F 16/9566* (2019.01); *G06F 16/986* (2019.01)

(58) Field of Classification Search
CPC . G06F 16/2379; G06F 16/986; G06F 16/9566
See application file for complete search history.

(56) References Cited

U.S. PATENT DOCUMENTS

| | | | |
|---|---|---|---|
| 7,117,504 B2 * | 10/2006 | Smith | G06F 8/20 709/227 |
| 9,256,657 B1 * | 2/2016 | Evenson | G06F 16/258 |
| 9,317,256 B2 * | 4/2016 | Plugin | G06F 8/33 |
| 10,592,485 B1 * | 3/2020 | Morgan | G06F 16/252 |
| 10,769,168 B1 * | 9/2020 | Dziuk | G06F 16/252 |
| 2007/0039050 A1 * | 2/2007 | Aksenov | G06F 16/954 726/22 |
| 2018/0039490 A1 * | 2/2018 | Gass | G06F 8/427 |
| 2020/0099772 A1 * | 3/2020 | Ray | H04L 67/60 |
| 2021/0133274 A1 * | 5/2021 | Chu | G06F 16/9577 |
| 2022/0107923 A1 * | 4/2022 | Chittiprolu | G06F 16/212 |

OTHER PUBLICATIONS

International Search Report and Written Opinion on PCT Appl. Ser. No. PCT/US2022/046415 dated Feb. 10, 2023 (19 pages).

(Continued)

*Primary Examiner* — Huawen A Peng
(74) *Attorney, Agent, or Firm* — Foley & Lardner LLP

(57) ABSTRACT

A method for integrating heterogeneous computing systems including identifying, by an endpoint system agent operating on a client device, a read/write operation associated with the client device based on monitoring an operation of a program executed on the client device, extracting, by the endpoint system agent from at least one of the client device or a client system in communication with the client device, data having a first syntax associated with the client system, receiving, by the endpoint system agent from an endpoint system, one or more rules describing a mapping between the first syntax and a second syntax associated with the endpoint system, executing, by the endpoint system agent, the one or more rules to modify the data to conform to the second syntax to produce mapped data, and transmitting, by the endpoint system agent, the mapped data to the endpoint system.

18 Claims, 8 Drawing Sheets

(56) References Cited

OTHER PUBLICATIONS

Invitation to Pay Additional Fees on PCT Appl. Ser. No. PCT/US2022/046415 dated Dec. 19, 2022.
Novell DirXML 1.1, "Novell DirXML Administration Guide," Novell, Jan. 1, 2002, XP002309371, retrieved from http://www.directory-info.com/DirXML/dirxmlAdmin.pdf on Nov. 24, 2004.
Saxonica, Michael K., "XSL Transformations (XSLT) Version 2.0—W3C Working Draft Apr. 4, 2005," W3C, Apr. 4, 2005, XP055028208, retrieved from http://www.w3.org/TR/2005/WD-xslt20-20050404/ on May 25, 2012.

* cited by examiner

SYSTEMS AND METHODS FOR INTEGRATING HETEROGENEOUS COMPUTING SYSTEMS

BACKGROUND

Computing systems such as databases may store and/or operate on information according to a schema such as a set of syntactic rules (collectively "syntax"). Disparate computing systems may utilize non-compatible schemas, and accordingly, may have difficulty sharing data or working within an integrated system.

SUMMARY

The systems and methods discussed herein provide for efficient and easy integration of heterogeneous computing systems using non-compatible schemas by identifying a client system, detecting events associated with the client system, extracting information from the client system according to the identity of the client system, parsing the extracted information according to the identity of the client system to identify elements such as key-value pairs of a data array, converting the elements to conform to a schema associated with a receiving system based on a mapping between the identified client system and the receiving system, and transmitting the converted elements to the receiving system. Aspects of the present disclosure provide improved integration methods and computer architectures that may facilitate integrating heterogeneous computing systems to facilitate inter-system communication.

One implementation of the disclosure relates to a method for integrating heterogeneous computing systems including identifying, by an endpoint system agent operating on a client device, a read/write operation associated with the client device based on monitoring an operation of a program executed on the client device, extracting, by the endpoint system agent from at least one of the client device or a client system in communication with the client device, data having a first syntax associated with the client system in response to identifying the read/write operation, receiving, by the endpoint system agent from an endpoint system, one or more rules describing a mapping between the first syntax associated with the client system and a second syntax associated with the endpoint system, executing, by the endpoint system agent, the one or more rules to modify the data to conform to the second syntax associated with the endpoint system to produce mapped data, and transmitting, by the endpoint system agent, the mapped data to the endpoint system.

In some implementations, executing the one or more rules includes identifying a key of a key-value pair in a data array of the data based on a syntax of the key as specified by the one or more rules and replacing the key with a normalized key having the second syntax based on the mapping between the first syntax and the second syntax described by the one or more rules. In some implementations, executing the one or more rules further includes executing a regular expression to identify the key of the key-value pair in the data array. In some implementations, identifying the read/write operation based on monitoring the operation of the program includes capturing a plurality of packets and identifying from the plurality of packets an updated flat file modified according to the read/write operation. In some implementations, extracting the data includes (i) reading the updated flat file stored in the client system, (ii) comparing the updated flat file to an original flat file to identify one or more changes to the updated flat file, and (iii) retrieving data associated with the one or more changes from the updated flat file stored in the client system.

In some implementations, capturing the plurality of packets and identifying the updated flat file includes parsing a packet of the plurality of packets to identify a uniform resource identifier (URI) of the updated flat file. In some implementations, reading the updated flat file includes querying, by the endpoint system agent, the client system using the URI of the updated flat file. In some implementations, comparing the updated flat file to the original flat file includes parsing XML to identify a difference in a value of a key-value pair between the updated flat file and the original flat file. In some implementations, the method further includes receiving, by the endpoint system agent from the endpoint system, the original flat file. In some implementations, the endpoint system agent includes a web browser plugin and wherein extracting the data includes extracting, by the web browser plugin, a value associated with an input from a product field of a webpage. In some implementations, extracting the data includes parsing hypertext markup language (HTML) code of the webpage to identify a key-value pair associated with the product field and retrieving an identifier from the key-value pair associated with the product field.

Another implementation of the disclosure relates to one or more non-transitory computer-readable storage mediums having instructions stored thereon that, when executed by one or more processors, cause the one or more processors to identify a read/write operation associated with a client device based on monitoring an operation of a program executed on the client device, extract, from at least one of the client device or a client system in communication with the client device, data having a first syntax associated with the client system in response to identifying the read/write operation, receive, from an endpoint system, one or more rules describing a mapping between the first syntax associated with the client system and a second syntax associated with the endpoint system, execute the one or more rules to modify the data to conform to the second syntax associated with the endpoint system to produce mapped data, and transmit the mapped data to the endpoint system.

In some implementations, executing the one or more rules includes identifying a key of a key-value pair in a data array of the data based on a syntax of the key as specified by the one or more rules and replacing the key with a normalized key having the second syntax based on the mapping between the first syntax and the second syntax described by the one or more rules. In some implementations, executing the one or more rules further includes executing a regular expression to identify the key of the key-value pair in the data array. In some implementations, identifying the read/write operation based on monitoring the operation of the program includes capturing a plurality of packets and identifying from the plurality of packets an updated flat file modified according to the read/write operation. In some implementations, extracting the data includes (i) reading the updated flat file stored in the client system, (ii) comparing the updated flat file to an original flat file to identify one or more changes to the updated flat file, and (iii) retrieving data associated with the one or more changes from the updated flat file stored in the client system.

In some implementations, capturing the plurality of packets and identifying the updated flat file includes parsing a packet of the plurality of packets to identify a uniform resource identifier (URI) of the updated flat file. In some implementations, reading the updated flat file includes querying the client system using the URI of the updated flat file. In some implementations, comparing the updated flat file to the original flat file includes parsing XML, to identify a difference in a value of a key-value pair between the updated flat file and the original flat file. In some implementations, the instructions further cause the one or more processors to receive, from the endpoint system, the original flat file. In some implementations, extracting the data includes extracting, by a web browser plugin, a value associated with an input from a product field of a webpage. In some implementations, extracting the data includes parsing HTML of the webpage to identify a key-value pair associated with the product field and retrieving an identifier from the key-value pair associated with the product field.

Another implementation of the disclosure relates to a client device for integrating heterogeneous computing systems, the client device including a processor and memory, the memory having instructions stored thereon that, when executed by the processor, cause the processor to identify an interaction with a client system based on monitoring a network connection to the client system, extract, from the client system, data having a first syntax associated with the client system in response to identifying the interaction, receive, from an intermediary system, one or more rules describing a mapping between the first syntax associated with the client system and a second syntax associated with a recipient system, execute the one or more rules to modify the data to conform to the second syntax associated with the recipient system to produce mapped data, and transmit the mapped data to the intermediary system.

In some implementations, executing the one or more rules includes identifying a key of a key-value pair in a data array of the data based on a syntax of the key as specified by the one or more rules and replacing the key with a normalized key having the second syntax based on the mapping between the first syntax and the second syntax described by the one or more rules. In some implementations, executing the one or more rules further includes executing a regular expression to identify the key of the key-value pair in the data array. In some implementations, identifying the interaction based on monitoring the network connection includes capturing a plurality of packets and identifying from the plurality of packets an updated flat file modified according to the interaction. In some implementations, extracting the data includes (i) reading the updated flat file stored in the client system, (ii) comparing the updated flat file to an original flat file to identify one or more changes to the updated flat file, and (iii) retrieving data associated with the one or more changes from the updated flat file stored in the client system.

The various aspects and implementations may be combined where appropriate.

DETAILED DESCRIPTION

Figure 1:
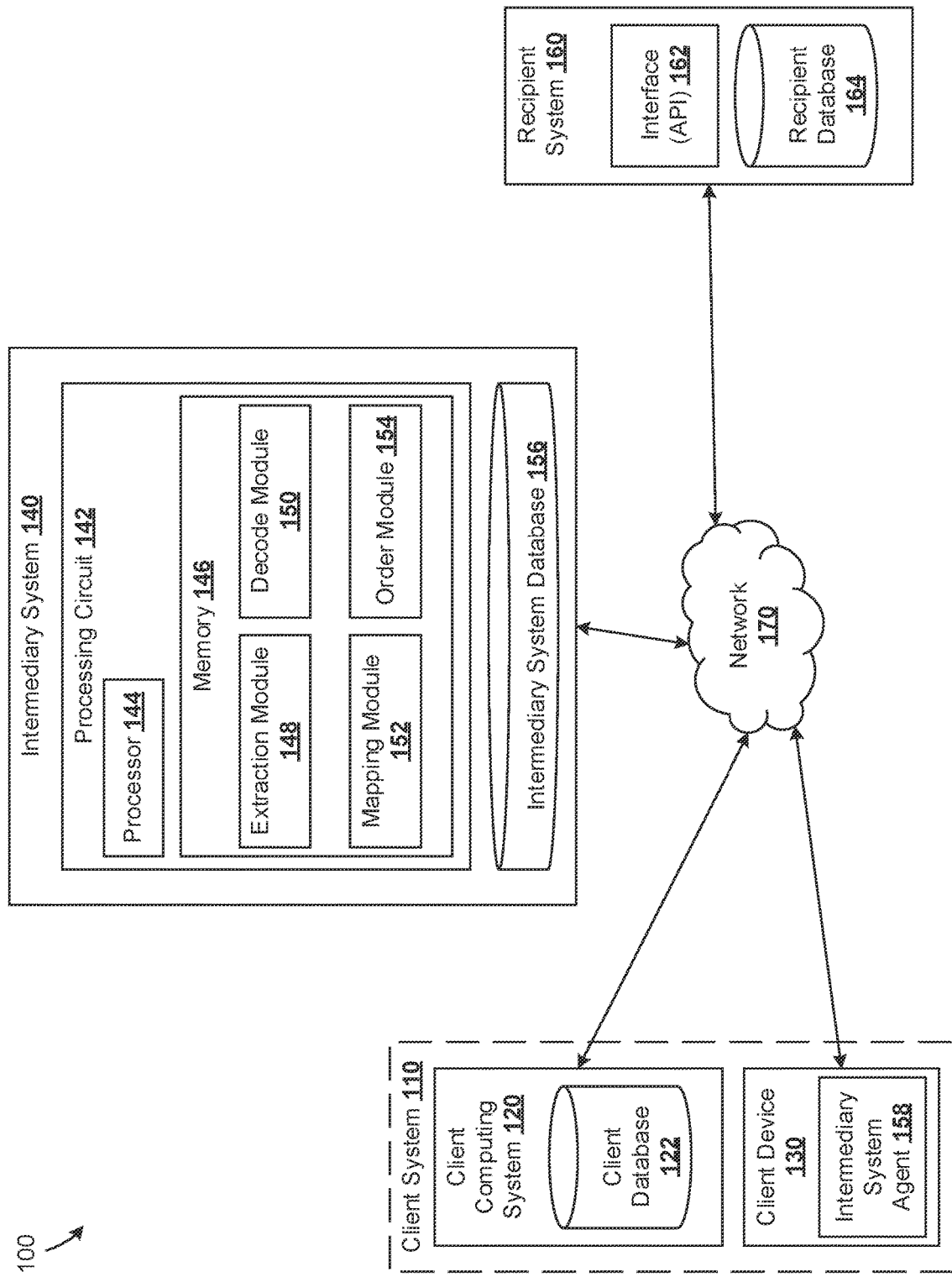
FIG. 1 is a block diagram illustrating a system for integrating heterogeneous computing systems, according to an illustrative implementation.

Following below are more detailed descriptions of various concepts related to, and implementations of, methods, apparatuses, and systems for integrating heterogeneous computing systems. The various concepts introduced above and discussed in greater detail below may be implemented in any of numerous ways, as the described concepts are not limited to any particular manner of implementation.

In many domains, it may be necessary or desirable to communicate between disparate computing systems. For example, it may be desirable for a supplier computing system to communicate with a retail computing system to facilitate fulfillment of retail orders. In various implementations, disparate computing systems may organize information according to disparate schemas. For example, a first supplier database may store information having a first syntax and a second retail database may store information having a second syntax that is non-compatible with the first syntax (e.g., such that the first supplier database cannot interpret the second syntax, the second retail database cannot interpret the first syntax, etc.). As another example, a first supplier database may use a first identifier to refer to an element such as a product and a second retail database may use a second identifier that is different than the first identifier to refer to the same element. Communication between disparate computing systems utilizing disparate information schemas (e.g., heterogeneous computing systems, etc.) may require mapping between the disparate information schemas. For example, a first dataset having a first syntax may be converted into a second dataset having a second syntax while preserving the information value of the first dataset. As another example, a first identifier of a first dataset may be converted into a second identifier associated with a second dataset according to a mapping between the identifiers of the first dataset and the second dataset.

Systems and methods of the present disclosure relate generally to integrating heterogeneous computing systems by translating between disparate information schemas, thereby facilitating communication between the heterogeneous computing systems. More specifically, systems and methods of the present disclosure relate to unique data extraction, parsing, and conversion methodologies to identify a client system, detect events associated with the client system, extract information from the client system according to the identity of the client system, parse the extracted information according to the identity of the client system to identify elements such as a key-value pairs of a data array, convert the elements to conform to a schema associated with a receiving system based on a mapping between the identified client system and the receiving system, and transmit the converted elements to the receiving system. In implementations lacking the systems and methods discussed herein, integrating heterogeneous computing systems requires manual correlation between disparate schemas. For example, a user may manually correlate a first schema and a second schema associated with a first and second computing system to a third schema associated with a third computing system in order to integrate the first and second computing systems with the third computing system. However, manual correlation between disparate schemas may be prohibitively resource intensive (e.g., require too much time and/or money, etc.). Moreover, some computing systems may lack an interface such as an application programming interface (API) to facilitate data exchange. For example, an electronic medical record (EMR) database may lack an API for providing data and/or may lack documentation on the specific schema used by the EMR database, thereby frustrating integration of the EMR with external systems. Therefore, there is a need for a unique data extraction, parsing, and conversion methodology to facilitate integration of heterogeneous computing systems.

Aspects of the present disclosure provide improved integration methods and computer architectures. The integration methods and architectures may be used to integrate heterogeneous computing systems to facilitate inter-system communication. For example, the integration methods and architectures may facilitate automatically identifying a client system from a number of client systems based on an information schema utilized by the client system, extracting information from the client system according to an access method specific to the identified client system, retrieving one or more rules specific to the identified client system that describe a mapping between a syntax of the identified client system and a syntax of a receiving system, and executing the one or more rules to normalize and standardize the extracted information.

Referring now to FIG. 1, system 100 for integrating heterogeneous computing systems is shown, according to an implementation. System 100 is shown to include client system 110, intermediary system 140, and recipient system 160. In various implementations, components of system 100 communicate over network 170. Network 170 may include computer networks such as the Internet, local, wide, metro or other area networks, intranets, satellite networks, other computer networks such as voice or data mobile phone communication networks, combinations thereof, or any other type of electronic communications network. In various implementations, network 170 facilitates secure communication between components of system 100. As a non-limiting example, network 170 may implement transport layer security (TLS), secure sockets layer (SSL), hypertext transfer protocol secure (HTTPS), and/or any other secure communication protocol.

Client system 110 is shown to include client computing system 120 and client device 130. In some implementations, client computing system 120 and client device 130 are separate computing systems. For example, client computing system 120 may include a server that is communicably connected (e.g., via network 170, etc.) to client device 130 executing an application to interface with functionality provided by the server. Additionally or alternatively, client computing system 120 and client device 130 may be integrated into a single computing system such as a point of sale (POS) device. In various implementations, client system 110 includes and/or constitutes a practice management system (PiMS) such as a veterinary PiMS. For example, client system 110 may include a veterinary PiMS to enable veterinary customers to submit prescription orders. However, it should be understood that client system 110 is not limited to a PiMS and that other implementations are possible. For example, client system 110 may include or constitute a POS, an EMR, a web server, and/or the like.

In various implementations, client system 110, or components thereof (e.g., client computing system 120, client device 130, etc.), utilize an information schema that is specific to client system 110. For example, a first entity may operate a first client system 110 that utilizes a first information schema and a second entity may operate a second client system 110 that utilizes a second information schema that is different than the first information schema. As another example, a first client system 110 may refer to a product using a first identifier and a second client system 110 may refer to the product using a second identifier that is different than the first identifier.

Client computing system 120 is shown to include client database 122. Client database 122 may store a dataset. For example, client database 122 may store an EMR dataset associated with a veterinarian practice. As another example, client database 122 may store an inventory dataset associated with inventory maintained by a veterinarian. The dataset may include one or more identifiers. For example, the dataset may include an identifier identifying a product (e.g., a prescription drug, etc.). Additionally or alternatively, the dataset may include demographic information, lab results, veterinarian identifiers, contact information (e.g., email addresses, phone numbers, etc.), shipping information (e.g., a street address, etc.), customer information, and/or the like. Client database 122 may include one or more storage mediums. The storage mediums may include but are not limited to magnetic storage, optical storage, flash storage, and/or RAM.

Client device 130 may interact with client computing system 120 to access and modify information stored in client database 122. For example, client device 130 may retrieve EMR data from client database 122 and modify the EMR data to reflect a visit summary input by a user of client device 130. In various implementations, client device 130 executes an application that interfaces with client database 122. For example, client device 130 may execute a PiMS application that integrates with client database 122 to provide PiMS functionality to a user of client device 130. Client device 130 may be or include a personal computer, mobile computing device, smartphone, tablet, or any other device to facilitate receiving, displaying, and interacting with content. In some implementations, client device 130 interacts with client computing system 120 via a webpage. For example, client computing system 120 may host a webpage and client device 130 may access the webpage via a web browser.

Client device 130 is shown to include intermediary system agent 158. Intermediary system agent 158 may be or include computer-executable instructions configured to cause client device 130 to perform the various operations described herein. For example, intermediary system agent 158 may automatically detect a type of client system 110 based on monitoring network traffic of client device 130, may extract information from client database 122 according to the detected type of client system 110, may modify the extracted information to confirm to a specific syntax, and may transmit the modified information to intermediary system 140. In some implementations, intermediary system agent 158 includes an application running on client device 130. For example, intermediary system agent 158 may include a web browser plugin. Additionally or alternatively, intermediary system agent 158 may include or be constituted as one or more function wrappers, libraries, executables, bash program, and/or the like. In some implementations, intermediary system agent 158 causes client device 130 to display one or more user interfaces (UIs). For example, intermediary system agent 158 may detect an event associated with client device 130 and may cause client device 130 to display a UI in response to the event. Intermediary system agent 158 is described in greater detail below.

In various implementations, intermediary system 140 is configured to prepare and deploy intermediary system agent 158 and interact with intermediary system agent 158 to integrate client system 110 with recipient system 160. For example, intermediary system 140 may facilitate extracting information from client database 122, converting the extracted information from a first schema associated with client system 110 to a second schema associated with recipient system 160, and transmitting the converted information to recipient system 160. In some implementations, system 100 includes multiple client systems 110 and/or recipient systems 160 and intermediary system 140 facilitates integrating the multiple client systems 110 with the multiple recipient systems 160. For example, intermediary system 140 may facilitate identifying a specific client system 110 from a number of client systems 110 and converting information associated with the specific client system 110 to a different schema used by a specific recipient system 160.

Intermediary system 140 is shown to include processing circuit 142 and intermediary system database 156. Processing circuit 142 may include processor 144 and memory 146. Memory 146 may have instructions stored thereon that, when executed by processor 144, cause processing circuit 142 to perform the various operations described herein. The operations described herein may be implemented using software, hardware, or a combination thereof. Processor 144 may include a microprocessor, ASIC, FPGA, etc., or combinations thereof. In many implementations, processor 144 may be a multi-core processor or an array of processors. Memory 146 may include, but is not limited to, electronic, optical, magnetic, or any other storage devices capable of providing processor 144 with program instructions. Memory 146 may include a floppy disk, CD-ROM, DVD, magnetic disk, memory chip, ROM, RAM, EEPROM, EPROM, flash memory, optical media, or any other suitable memory from which processor 144 can read instructions. The instructions may include code from any suitable computer programming language such as, but not limited to, C, C++, C#, Java, JavaScript, Perl, HTML, XML, Python and Visual Basic.

Memory 146 is shown to include extraction module 148, decode module 150, mapping module 152, and order module 154. Extraction module 148 may facilitate extracting information from client system 110, such as from client database 122. In various implementations, extraction module 148 receives information from intermediary system agent 158 operating on client device 130 that identifies a type of client system 110. For example, the information may identify client system 110 as a specific PiMS from a number of possible PiMS. Extraction module 148 may transmit one or more access methods to intermediary system agent 158 based on the identified type of client system 110. For example, extraction module 148 may transmit an identifier of a process thread associated with the identified type of client system 110 for intermediary system agent 158 to monitor. In various implementations, intermediary system 140 stores a data structure (e.g., in intermediary system database 156, etc.) that provides a mapping between a number of client systems and corresponding access methods. For example, intermediary system 140 may store a table having the mapping between the number of client systems and corresponding access methods and extraction module 148 may query the table using an identifier received from intermediary system agent 158 to retrieve the one or more access methods.

Decode module 150 may identify and decode an information schema associated with client system 110. For example, decode module 150 may perform signal analysis on a number of packets captured based on monitoring a network connection between client computing system 120 and client device 130 to determine an instruction syntax used for instructions between client computing system 120 and client device 130. As another example, decode module 150 may read a flat file stored by client database 122 and may analyze the flat file to determine a syntax used to represent information in the flat file. In various implementations, decode module 150 generates instructions based on the decoded information schema. For example, decode module 150 may generate computer-executable instructions for decoding a particular information schema associated with a particular client system and may transmit the computer-executable instructions to intermediary system agent 158 to facilitate intermediary system agent 158 parsing operations of client system 110.

Mapping module 152 may generate a mapping between elements associated with client system 110 and elements associated with recipient system 160. For example, mapping module 152 may determine a mapping between key-value pairs of a dataset associated with client system 110 and key-value pairs of a dataset associated with recipient system 160. As another example, mapping module 152 may determine a mapping between a first product identifier associated with client system 110 and a second product identifier associated with recipient system 160. In various implementations, mapping module 152 determines the mapping based on semantic analysis of information associated with each element. For example, mapping module 152 may perform fuzzy matching on a first product name from client system 110 and a second product name from recipient system 160 to determine that the first and second product names correspond to the same product and may generate a mapping between an identifier of the first product name and an identifier of the second product name based on the determination. In some implementations, mappings are determined manually. Additionally or alternatively, mappings may be determined automatically. For example, mapping module 152 may determine a covariance between a first element associated with client system 110 and a second element associated with recipient system 160 and may compare the covariance to a threshold to determine whether to generate a mapping between the first element and the second element.

In various implementations, mapping module 152 generates rules describing the mapping between elements. For example, mapping module 152 may generate regular expression rules to identify a first syntax of a first key-value pair and convert the first key-value pair into a second key-value pair having a second syntax. As another example, mapping module 152 may receive a first listing of identifiers associated with client system 110 and a second listing of identifiers associated with recipient system 160 and may generate a number of rules to convert identifiers from the first listing to conform with the second listing (e.g., by changing identifier values and/or identifier syntax, etc.). In various implementations, intermediary system 140 includes an interface to facilitate viewing and modifying the rules. For example, intermediary system 140 may host a webpage to enable users to view and modify the rules. In various implementations, mapping module 152 may execute one or more of the rules to modify data. For example, mapping module 152 may receive a dataset from intermediary system agent 158 and may execute one or more rules on the dataset to convert a first set of identifiers associated with client system 110 included in the dataset to a second set of identifiers associated with recipient system 160.

Order module 154 may analyze received data to identify one or more elements from the data and transmit an order to recipient system 160 based on the one or more elements. For example, order module 154 may identify elements from a dataset received from intermediary system agent 158 having a flag and may transmit a request to recipient system 160 according to the elements having the flag. As another example, order module 154 may parse a dataset received from intermediary system agent 158 to identify a prescription order having a virtual distribution flag and may generate and transmit an order to recipient system 160 using an identifier associated with the prescription order.

In various implementations, the modules of memory 146 are implemented as computer-executable instructions executed by intermediary system 140 and configured to cause intermediary system 140 to perform the various operations described herein.

Intermediary system database 156 may store a dataset. For example, intermediary system database 156 may store a translated version of data stored in client database 122. As another example, intermediary system agent 158 may extract a flat file from client database 122, may normalize the information included in the flat file, and may transmit the normalized flat file to intermediary system 140 which may standardize the information included in the normalized flat file, and store the normalized/standardized flat file in intermediary system database 156. In some implementations, intermediary system database 156 is usable to restore client database 122. For example, intermediary system database 156 may store a copy of the contents of client database 122 and intermediary system 140 may transmit the copy to client database 122 to restore client database 122 (e.g., in the event of data loss, etc.). Intermediary system database 156 may include one or more storage mediums. The storage mediums may include but are not limited to magnetic storage, optical storage, flash storage, and/or RAM.

As used herein "normalization" refers to converting fields from a first schema to a second schema. For example, a first data array may include the fields "name ID," "quantity," and "source" and normalization may include converting the fields to "ID," "count," and "referral ID," respectively. As another example, a first data array may include the field "name ID" having the value "John" and normalization may include replacing the "name ID" with "ID" while leaving the value "John" unchanged. As used herein "standardization" refers to converting field values from a first schema to a second schema. For example, a first data array may include the field "product ID" having the value "#123456" and standardization may include converting the value from "#123456" to "S-209-A02-5B."

Recipient system 160 includes an interface, shown as API 162, and recipient database 164. In various implementations, recipient system 160 is associated with a supplier such as a supplier of veterinary products. API 162 may be configured to exchange information with external systems and/or cause recipient system 160 to perform various actions based. For example, intermediary system 140 may transmit an order having an identifier to recipient system 160 via API 162 and recipient system 160 may execute an order for a product based on the received identifier.

Recipient database 164 may store a dataset. For example, recipient database 164 may store a dataset including a number of identifiers associated with prescription products. In some implementations, intermediary system 140 may query recipient database 164 (e.g., via API 162, etc.) to retrieve the number of identifiers to facilitate mapping between the number of identifiers and a different set of identifiers associated with client system 110. Recipient database 164 may include one or more storage mediums. The storage mediums may include but are not limited to magnetic storage, optical storage, flash storage, and/or RAM.

In various implementations, recipient system 160, or components thereof (e.g., API 162, recipient database 164, etc.), utilize an information schema that is specific to recipient system 160. For example, a first entity may operate a first recipient system 160 that utilizes a first information schema and a second entity may operate a second recipient system 160 that utilizes a second information schema that is different than the first information schema. As another example, a first recipient system 160 may refer to a product using a first identifier and a second recipient system 160 may refer to the product using a second identifier that is different than the first identifier.

Figure 2:
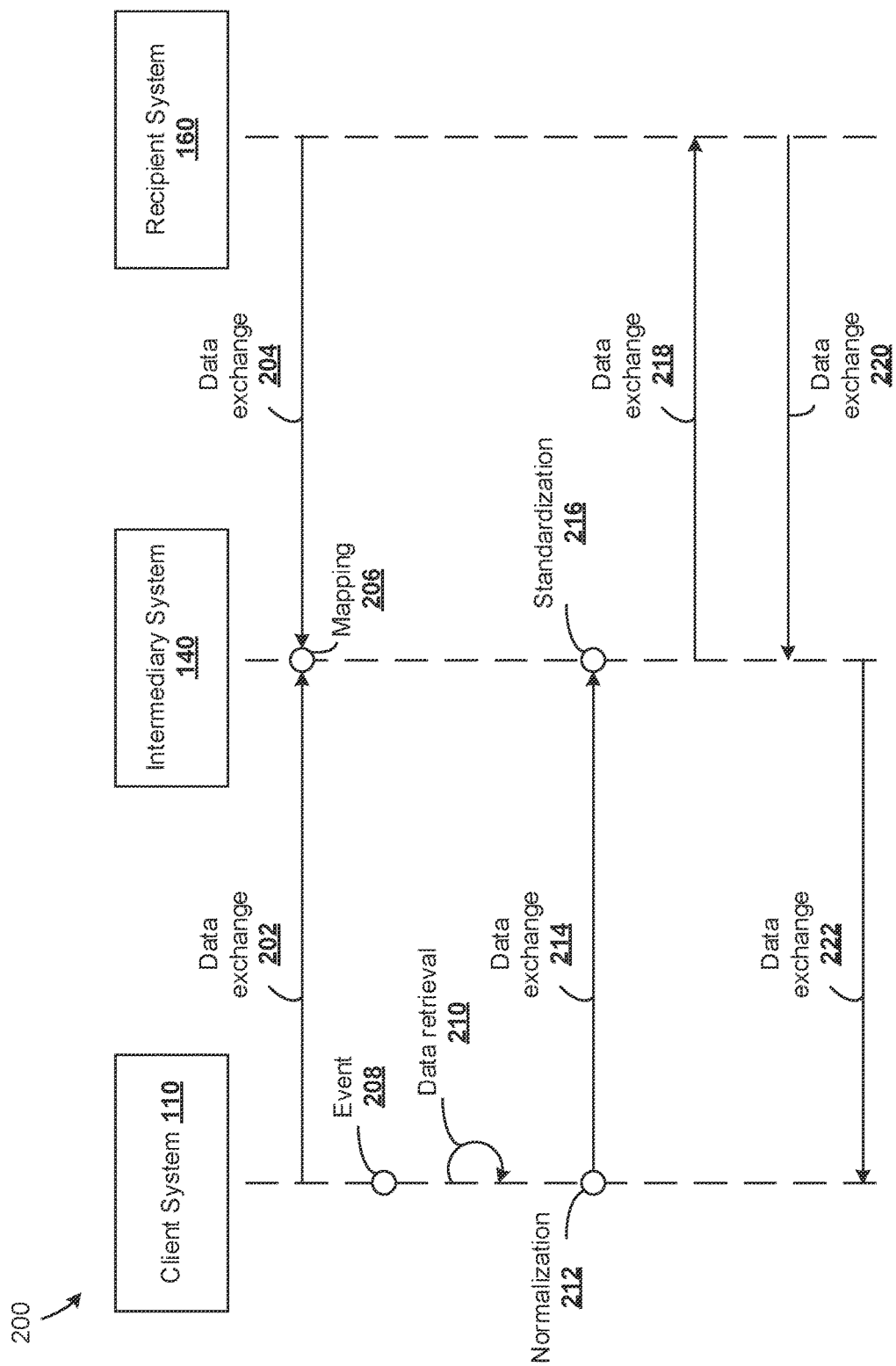
FIG. 2 is a diagram illustrating data transfer between the various entities of FIG. 1, according to an illustrative implementation.

Referring now to FIG. 2, a data transfer model 200 is shown via a signal flow or swim lane diagram, according to an implementation. Data transfer model 200 illustrates interactions between client system 110, intermediary system 140, and recipient system 160. Speaking generally, intermediary system 140 may receive a first dataset from client system 110 and a second dataset from recipient system 160 and may determine a mapping between elements of the first and second datasets. Intermediary system agent 158, operating on client system 110, may identify client system 110 and may retrieve one or more rules describing the mapping between elements associated with the identified client system 110 and recipient system 160 from intermediary system 140. Intermediary system agent 158 may extract information from client system 110 according to the identity of client system 110 (e.g., because access/extraction methods may vary by client system, etc.) and may execute the one or more rules on the extracted information to normalize the extracted information to produce normalized information. Intermediary system agent 158 may transmit the normalized information to intermediary system 140 which may execute one or more additional rules to standardize the normalized information to produce standardized information. Intermediary system 140 may identify one or more elements having a characteristic (e.g., a flag, etc.) from the normalized information and may transmit at least a portion of the standardized information to recipient system 160 based on the characteristic.

At step 202, intermediary system agent 158 operating on client system 110 may transmit information including a number of identifiers to intermediary system 140. In various implementations, intermediary system agent 158 extracts the information from client system 110 (e.g., by performing a read operation on client database 122 that mimics an organic read operation of an application such as a PiMS operating on client device 130, etc.). In various implementations, intermediary system agent 158 generates a computer instruction based on a decoding provided by intermediary system 140. For example, intermediary system agent 158 may format a read operation to transmit to client database 122 according to a set of computer-executable instructions received from intermediary system 140. In various implementations, the information conforms to a schema that is different than a schema used by recipient system 160 to represent information.

At step 204 (synchronously or asynchronously with step 202, in various implementations), recipient system 160 may transmit structured data to intermediary system 140. For example, recipient system 160 may transmit a data structure such as a data array having a number of key-value pairs. In some implementations, step 204 includes transmitting a request from intermediary system 140 to recipient system 160. For example, intermediary system 140 may request a schema from recipient system 160 via API 162 and recipient system 160 may transmit a data array to intermediary system 140 in response to the request. In various implementations, the structured data includes one or more identifiers used to identify one or more products. In various implementations, the structures data conforms to a schema that is different than a schema used by client system 110 to represent information.

At step 206, intermediary system 140 may generate a mapping between a first schema associated with client system 110 and a second schema associated with recipient system 160. In various implementations, step 206 includes mapping a first identifier used to identify a product by client system 110 to a second identifier used to identify the same product by recipient system 160. In various implementations, step 206 includes generating a similarity score such as a covariance between a first identifier and a second identifier. For example, intermediary system 140 may receive a first identifier and first context information from client system 110 and may receive a second identifier and second context information from recipient system 160, may generate a covariance between the first identifier and the second identifier using the first and second context information, and may compare the covariance to a threshold to determine whether the first and second identifiers are related.

In some implementations, step 206 includes comparing auxiliary/context information associated with a key-value pair to determine an association with another key-value pair. For example, intermediary system 140 may compare a price, description, and quantity associated with a first product identifier to a price, description, and quantity associated with a second product identifier to determine whether the first and second product identifiers refer to the same product. In various implementations, step 206 includes generating one or more rules describing the mapping between the first schema and the second schema. For example, step 206 may include generating a number of regular expression rules for converting key-value pairs of a first schema into key-value pairs that conform with a second schema. In some implementations, one or more of the rules take the form of an IF-THEN statement. In various implementations, the one or more rules may be transmitted to client system 110 to facilitate normalization (e.g., step 212, etc.). In various implementations, intermediary system 140 performs step 206 using at least a portion of the information from step 202 and the structured data from step 204.

At step 208, intermediary system agent 158 may detect an event associated with client system 110. For example, intermediary system agent 158 may detect a read/write operation associated with client system 110. In various implementations, step 208 includes monitoring the operation of a program executed on client device 130. For example, step 208 may include reading execution calls associated with a PiMS running on client device 130. As another example, step 208 may include capturing a number of packets associated with network communication between client device 130 and client computing system 120. As yet another example, step 208 may include parsing hypertext markup language (HTML) code of a webpage displayed by a web browser of client device 130 to identify a key-value pair associated with a product field of the webpage. In some implementations, the event includes a checkout action associated with a transaction (e.g., clicking a "checkout" button, etc.). For example, client device 130 executing a PiMS may display a checkout screen as part of a transaction and intermediary system agent 158 may monitor operation of the PiMS to identify an execution call corresponding to the checkout screen.

At step 210, intermediary system agent 158 may retrieve data from client system 110. In various implementations, step 210 includes extracting information from client database 122 in response to detecting the event. For example, intermediary system agent 158 may query client database 122 using a uniform resource identifier (URI) extracted from a flat file associated with a detected read/write operation to retrieve an updated flat file modified according to the read/write operation. As another example, intermediary system agent 158 may fetch a data structure from a location in memory identified based on monitoring execution calls associated with a PiMS running on client device 130. Additionally or alternatively, step 210 may include extracting information from a webpage in response to detecting the event. For example, intermediary system agent 158 may parse HTML code of a webpage to retrieve one or more key-value pairs associated with the webpage. In various implementations, the extracted information conforms to a first schema (e.g., uses a first syntax and a first set of values/identifiers, etc.).

In some implementations, step 210 includes screen scraping information from an interface displayed by client device 130. Additionally or alternatively, intermediary system agent 158 may extract a key-value pair from a RESTful request between client device 130 and client computing system 120. In some implementations, step 210 includes extracting a payload from XML. Additionally or alternatively, step 210 may include extracting information using a function-hook (e.g., to execute injected code, etc.). In various implementations, intermediary system agent 158 may perform a read operation on client database 122 to retrieve the data. For example, intermediary system agent 158 may read client database 122 in hexadecimal and decode the hexadecimal to identify information therefrom. In some implementations, step 210 includes replicating/mimicking a request from client device 130. For example, intermediary system agent 158 may generate a root user and query client database 122 implementing a secure SQL server using the root user to retrieve the data before deleting the root user. In some implementations, step 210 includes retrieving prescription information (e.g., a prescription identifier, an individual associated with the prescription, a business associated with the prescription, etc.) associated with a prescription order from client database 122.

At step 212, intermediary system agent 158 may normalize the extracted information. For example, intermediary system agent 158 may parse the extracted information to identify a first key of a key-value pair having a first syntax and may replace the first key with a second key having a second syntax. In various implementations, step 212 includes executing one or more rules to convert the extracted information from a first syntax into a second syntax. For example, step 212 may include executing a regular expression on a string representing a key of a key-value pair to determine whether the string has certain characteristics (e.g., conforms to a specific syntax, includes specific characters, etc.). As another example, step 212 may include replacing a first key of a key-value pair represented as "/field #1/" with a second key represented as "Field 1."

In various implementations, step 212 includes retrieving, by intermediary system agent 158, one or more rules from intermediary system 140. For example, intermediary system agent 158 may transmit a message including an identifier identifying client system 110 and may receive a number of rules corresponding to the identified client system 110 from intermediary system 140 in response. In some implementations, step 212 includes intermediary system agent 158 determining an identifier of client system 110. For example, intermediary system agent 158 may monitor operation of client system 110 to determine, based on a syntax of the operational instructions of client system 110, an identifier corresponding to client system 110.

At step 214, intermediary system agent 158 may transmit at least a portion of the normalized information to intermediary system 140. For example, intermediary system agent 158 may transmit a data structure having a number of fields that have been replaced to conform to a schema used by intermediary system 140. In various implementations, step 214 includes transmitting a table having a number of identifiers. For example, step 214 may include transmitting a copy of the contents of client database 122 that have been modified to conform to a schema used by intermediary system 140. In some implementations, step 214 includes querying intermediary system 140 for information. For example, intermediary system agent 158 may query intermediary system 140 for pricing information and/or shipping times associated with a prescription product.

At step 216, intermediary system 140 may standardize the received normalized information. For example, intermediary system 140 may parse the normalized information to identify a first value of a key-value pair and may replace the first value with a second value according to a mapping between values. In various implementations, step 216 includes executing one or more rules to convert values of the normalized information from a first schema to a second schema. For example, step 216 may include executing a regular expression on a first alphanumeric value of a key-value pair to determine whether the first alphanumeric value is a specific alphanumeric value and replacing the first alphanumeric value with a second alphanumeric value that is mapped to the specific alphanumeric value. As another example, step 216 may include replacing a first value of a key-value pair represented as "Medication #20938" with a second value represented as "#208-B209-D2." In various implementations, the one or more rules are determined during step 206. In various implementations, the result of step 216 includes standardized information.

In various implementations, step 216 includes identifying one or more elements of the standardized information having a characteristic. For example, intermediary system 140 may parse the standardized information to identify a data element associated with a data flag. In some implementations, the characteristic includes a "ship to home" flag. For example, the standardized information may include a number of transactions associated with a veterinarian practice and step 216 may include identifying a number of the transactions that have been flagged for a "ship to home" service.

At step 218, intermediary system 140 may transmit information to recipient system 160 based on the identified elements. For example, intermediary system 140 may generate an order for one or more products based on a number of transactions identified from the standardized information. In various implementations, step 218 includes transmitting one or more identifiers (e.g., product identifiers, etc.) to recipient system 160. Additionally or alternatively, step 218 may include transmitting auxiliary/context information to recipient system 160. For example, intermediary system 140 may transmit a shipping address, payment information, and/or prescription information to recipient system 160. In some implementations, step 218 includes querying recipient system 160 for information. For example, intermediary system 140 may query recipient system 160 for pricing information associated with one or more products. In various implementations, intermediary system 140 communicates with recipient system 160 via API 162. In various implementations, the information transmitted to recipient system 160 conforms to a schema used by recipient system 160 (e.g., is normalized and/or standardized, etc.).

At step 220, recipient system 160 may transmit information to intermediary system 140. For example, recipient system 160 may transmit an acknowledgement (i.e., an ACK, etc.) in response to receiving an order from intermediary system 140. As another example, recipient system 160 may transmit a response to a query submitted by intermediary system 140. For example, recipient system 160 may transmit pricing information associated with one or more products.

At step 222, intermediary system 140 may transmit information to client system 110. For example, intermediary system 140 may transmit an acknowledgement (i.e., an ACK, etc.) in response to step 214 (e.g., confirming an order has been submitted, etc.). As another example, recipient system 160 may transmit a response to a query submitted by intermediary system agent 158. For example, intermediary system 140 may transmit pricing information and/or shipping times associated with a prescription product to intermediary system agent 158.

Figure 3:
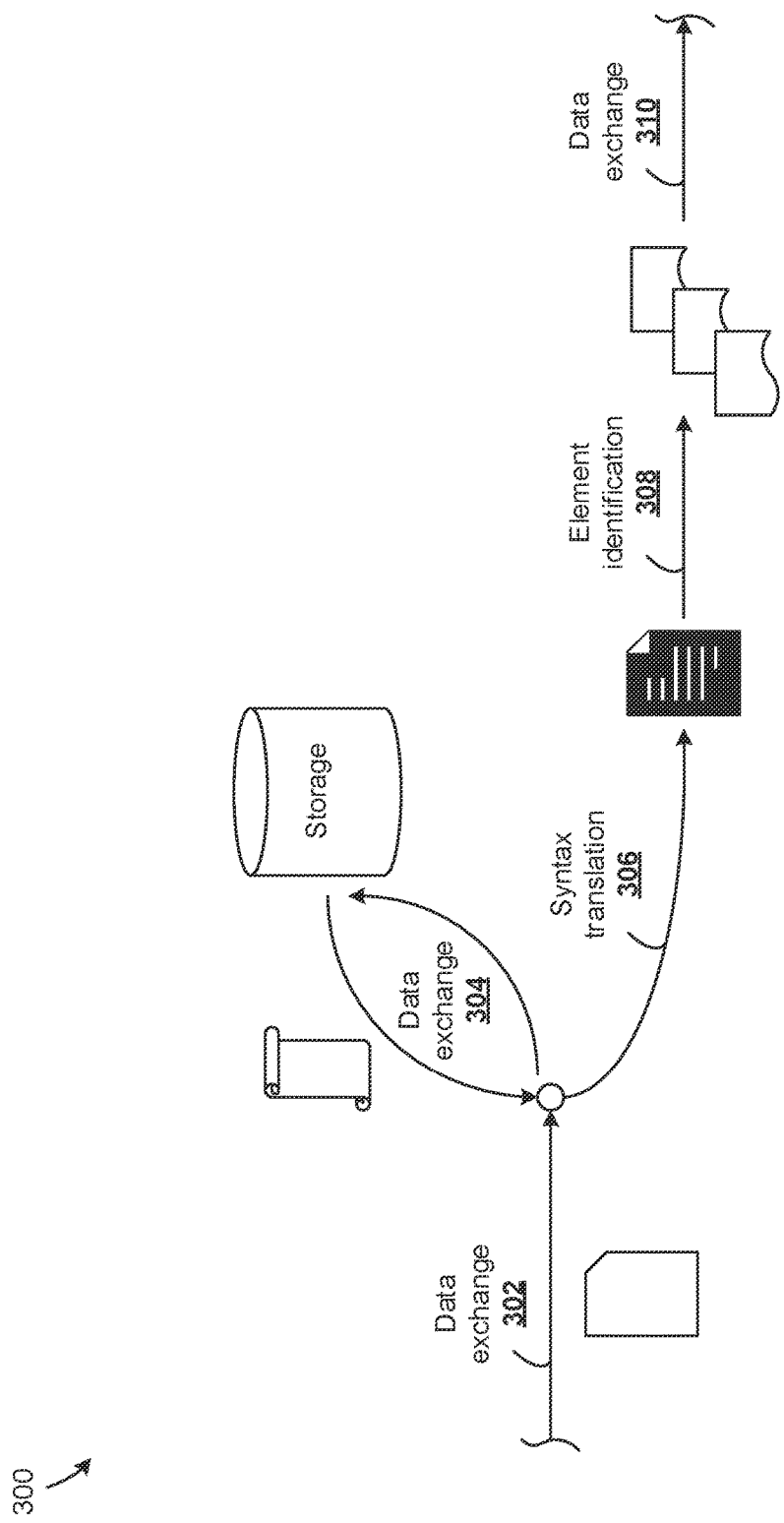
FIG. 3 is a diagram illustrating a method for the system of FIG. 1 to convert data from a client system having a first syntax into a second syntax, according to an illustrative implementation.

Referring now to FIG. 3, model 300 for converting data from a first schema to a second schema is shown, according to an implementation. For example, intermediary system agent 158 may implement model 300 to modify data from client system 110 having a first syntax to convert the data to a second syntax. At step 302, intermediary system agent 158 may receive data from client system 110. For example, intermediary system agent 158 may query client database 122 to receive the data. As another example, intermediary system agent 158 may extract the data from a HTML, webpage displayed by client device 130. In various implementations, the data conforms to a first schema such as a key-value pair having a first syntax associated with client system 110. For example, the data may include a table having a number of fields and a number of values corresponding to each of the number of fields in which each specific field and the construction (e.g., syntax, etc.) thereof is specific to client system 110 and/or each specific value and the construction (e.g., syntax, etc.) thereof is specific to client system 110.

At step 304, intermediary system agent 158 may retrieve information from storage based on an identity of client system 110. For example, intermediary system agent 158 may query intermediary system database 156 using an identifier associated with client system 110 to retrieve one or more rules describing a mapping between a first syntax associated with client system 110 and a second syntax associated with recipient system 160. Additionally or alternatively, the second syntax may be associated with intermediary system 140.

At step 306, intermediary system agent 158 may translate the data received from client system 110 according to the information received from storage. For example, intermediary system agent 158 may execute one or more regular expression rules on a data structure having a number of key-value pairs to replace one or more of the keys with replacement keys having a different value and/or syntax. For example, step 306 may include modifying a key-value pair as shown below.

Key: Date (MDY); Value: 12171990→Key: Date; Value: 12171990

As another example, step 306 may include modifying a key-value pair as shown below.

Key: Tuple_Size; Value: 10→Key: Length; Value: 10

In various implementations, step 306 includes replacing one or more column/row headers. For example, step 306 may include modifying a data structure received during step 302. Additionally or alternatively, step 306 may include generating a new data structure based on the data received during step 302. Step 306 may include padding, truncating, shifting values, adding identifiers, and/or the like. In some implementations, step 306 includes parsing the data received from client system 110 to identify one or more elements to modify. In various implementations, step 306 includes producing normalized data (e.g., a normalized data structure, etc.). Step 306 is described in greater detail below with reference to FIGS. 4A-4B.

At step 308, intermediary system agent 158 may identify one or more elements from the normalized data having a characteristic. For example, intermediary system agent 158 may identify a number of columns in a table having a data flag. In various implementations, step 308 may include extracting the one or more elements from the normalized data. For example, intermediary system agent 158 may generate a new data structure having the one or more elements and discard elements that do not include the characteristic. As another example, intermediary system agent 158 may extract a number of rows from a table, each row corresponding to transaction flagged for a "ship to home" service. At step 310, intermediary system agent 158 may transmit the one or more elements to intermediary system 140. For example, intermediary system agent 158 may transmit a number of rows from a table to intermediary system 140. Additionally or alternatively, step 310 may include retrieving and/or transmitting auxiliary/context information. For example, intermediary system agent 158 may identify a from a data structure a transaction having a characteristic, may retrieve context information associated with the transaction (e.g., a time, an associated customer, shipping information, prescription information, etc.), and transmit the context information to intermediary system 140.

Figure 4A:
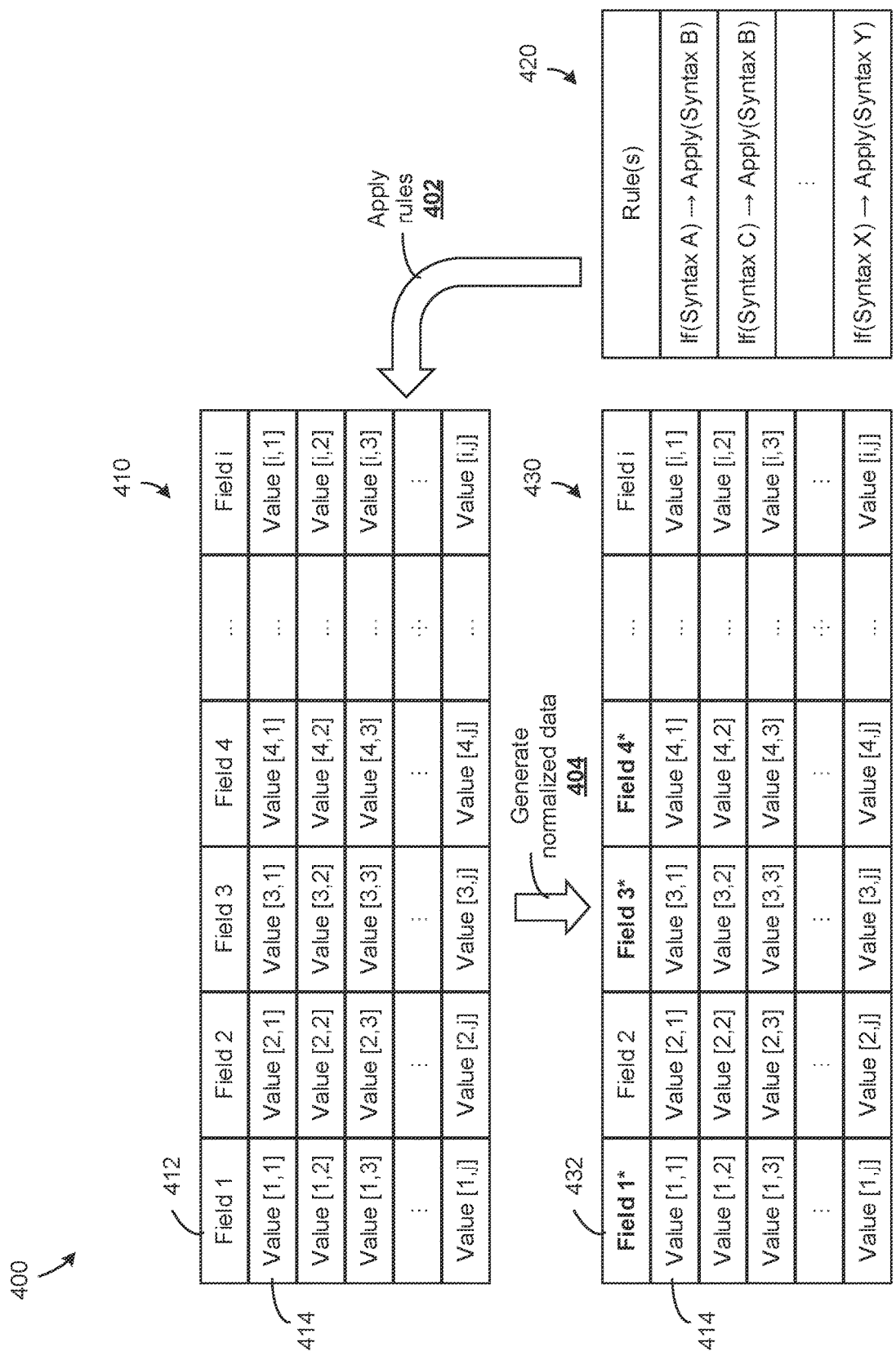
FIGS. 4A-4B are a diagram illustrating the method of FIG. 3 for converting data having a first syntax into a second syntax, according to an illustrative implementation.
Figure 4B:
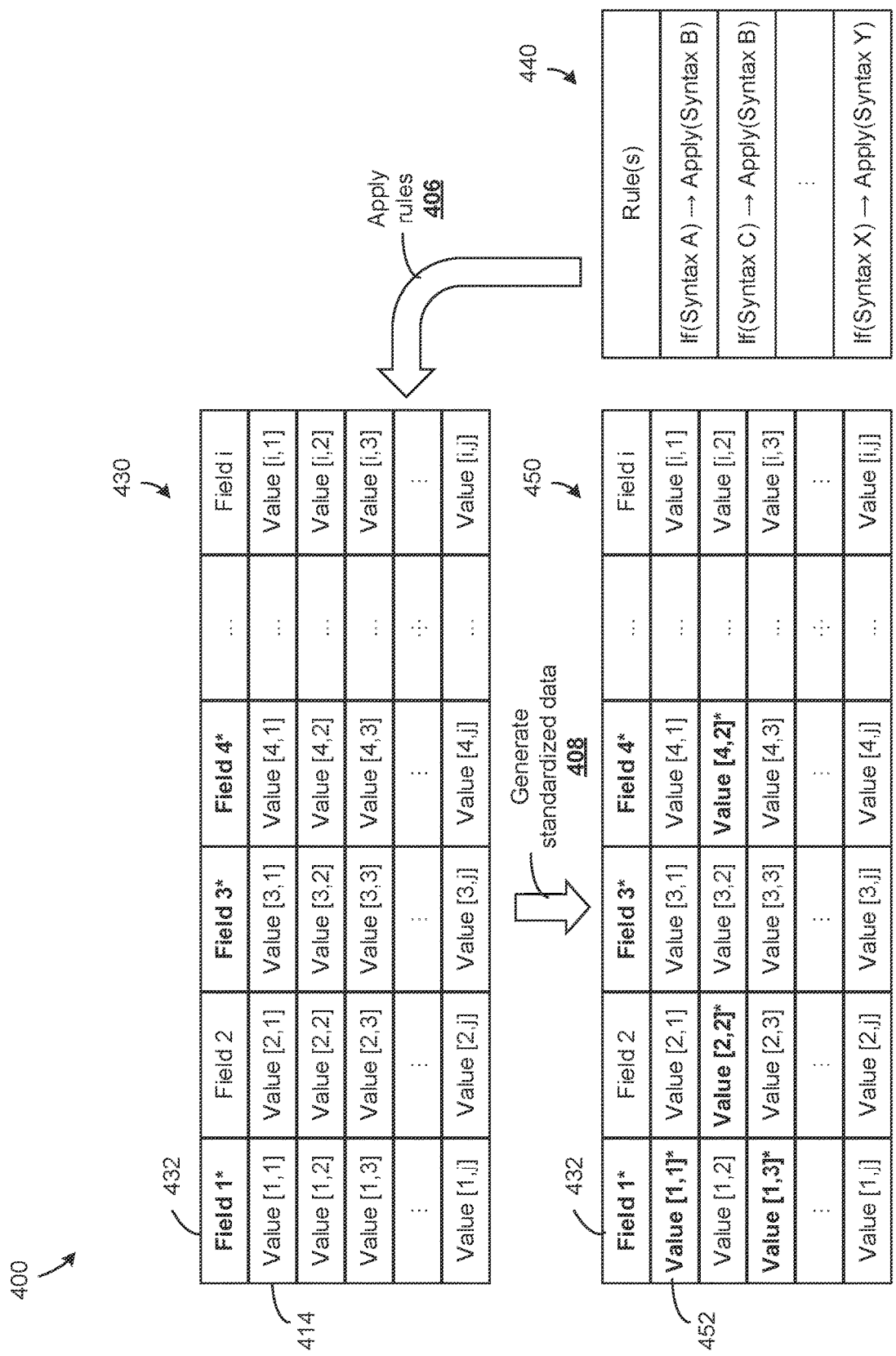

Referring now to FIGS. 4A-4B, method 400 for converting data having a first schema into a second schema is shown, according to an implementation. In various implementations, intermediary system agent 158 and/or intermediary system 140 perform method 400. For example, intermediary system agent 158 and intermediary system 140 may cooperate to perform method 400 periodically (e.g., hourly, daily, etc.) and/or in response to an event such as an interaction on client device 130 detected by intermediary system agent 158. It should be understood that while FIGS. 4A-4B are described in relation to a data structure represented as a 2-dimensional table, other data structures/representations are possible and within the scope of the present disclosure (e.g., 3-dimensional tables, graph data structures, etc.).

Method 400 is shown to include table 410 having fields 412 and corresponding values 414. Fields 412 are shown as column headers, however it should be understood that fields 412 may include row headers in addition and/or alternatively to column headers. For example, table 410 may be a table including transaction information for a number of transactions where each row header corresponds to a transaction and each column header corresponds to a field associated with the transaction. In various implementations, intermediary system agent 158 retrieves table 410 from client system 110 as described above. For example, intermediary system agent 158 may query a SQL server (e.g., client database 122, etc.) to retrieve table 410. In various implementations, fields 412 are specific to client system 110. For example, a first client system 110 may have a first combination of fields 412 and a second client system 110 may have a second combination of fields 412 that are different than the first combination of fields 412 (e.g., have different field values, are represented using a different syntax, etc.).

At step 402, intermediary system agent 158 may apply rules 420 on table 410. For example, step 402 may include executing a regular expression to parse table 410 to identify fields 412 having a first syntax. As another example, step 402 may include replacing one or more of fields 412 with different fields that conform to a schema used by intermediary system 140 and/or recipient system 160. In various implementations, intermediary system agent 158 receives rules 420 from intermediary system 140.

At step 404, intermediary system agent 158 may generate normalized table 430. In various implementations, step 404 is performed based on applying rules 420 (e.g., step 402). For example, intermediary system agent 158 may apply rules 420 to generate normalized table 430. Normalized table 430 may include normalized fields 432 and values 414. Normalized fields 432 may differ from fields 412. For example, fields 412 may be associated with a schema of client system 110 and normalized fields 432 may be associated with a schema of recipient system 160. In some implementations, step 404 includes padding, truncating, inserting, shifting, and/or otherwise modifying fields 412 to produce normalized fields 432. In some implementations, intermediary system agent 158 may transmit normalized table 430 to intermediary system 140.

At step 406, intermediary system 140 may apply rules 440 on normalized table 430. For example, step 406 may include executing a regular expression to parse normalized table 430 to identify values 414 having a first syntax and/or matching one of a number of identifiers. As another example, step 406 may include replacing one or more of values 414 with different values that conform to a schema used by intermediary system 140 and/or recipient system 160. In various implementations, step 406 includes replacing one or more first identifiers with one or more second identifiers. For example, client system 110 may use a first identifier to refer to a product and intermediary system 140 may replace the first identifier with a second identifier used by recipient system 160 to refer to the product.

At step 408, intermediary system 140 may generate standardized table 450. In various implementations, step 408 is performed based on applying rules 440 (e.g., step 406). For example, intermediary system 140 may apply rules 440 to generate standardized table 450. Standardized table 450 may include normalized fields 432 and standardized values 452. Standardized values 452 may differ from values 414. For example, values 414 may be associated with a schema of client system 110 and standardized values 452 may be associated with a schema of recipient system 160. In some implementations, step 408 includes padding, truncating, inserting, shifting, and/or otherwise modifying values 414 to produce standardized values 452. Additionally or alternatively, step 408 may include replacing values 452 to produce standardized values 452, such as replacing a first identifier with a second identifier.

Figure 5A:
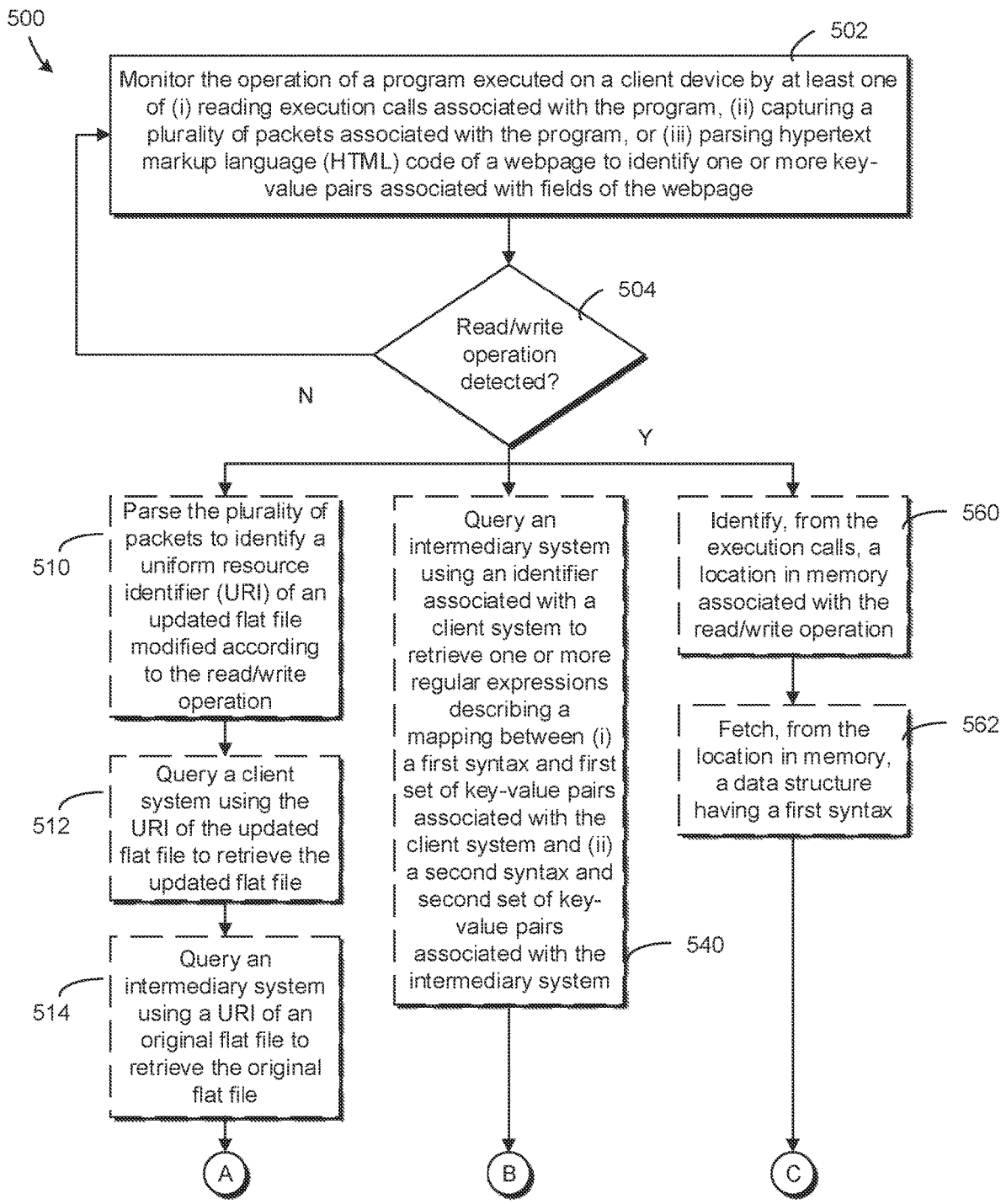
FIGS. 5A-5C are a flow diagram illustrating a method of integrating heterogeneous computing systems using the system of FIG. 1, according to an illustrative implementation.
Figure 5B:
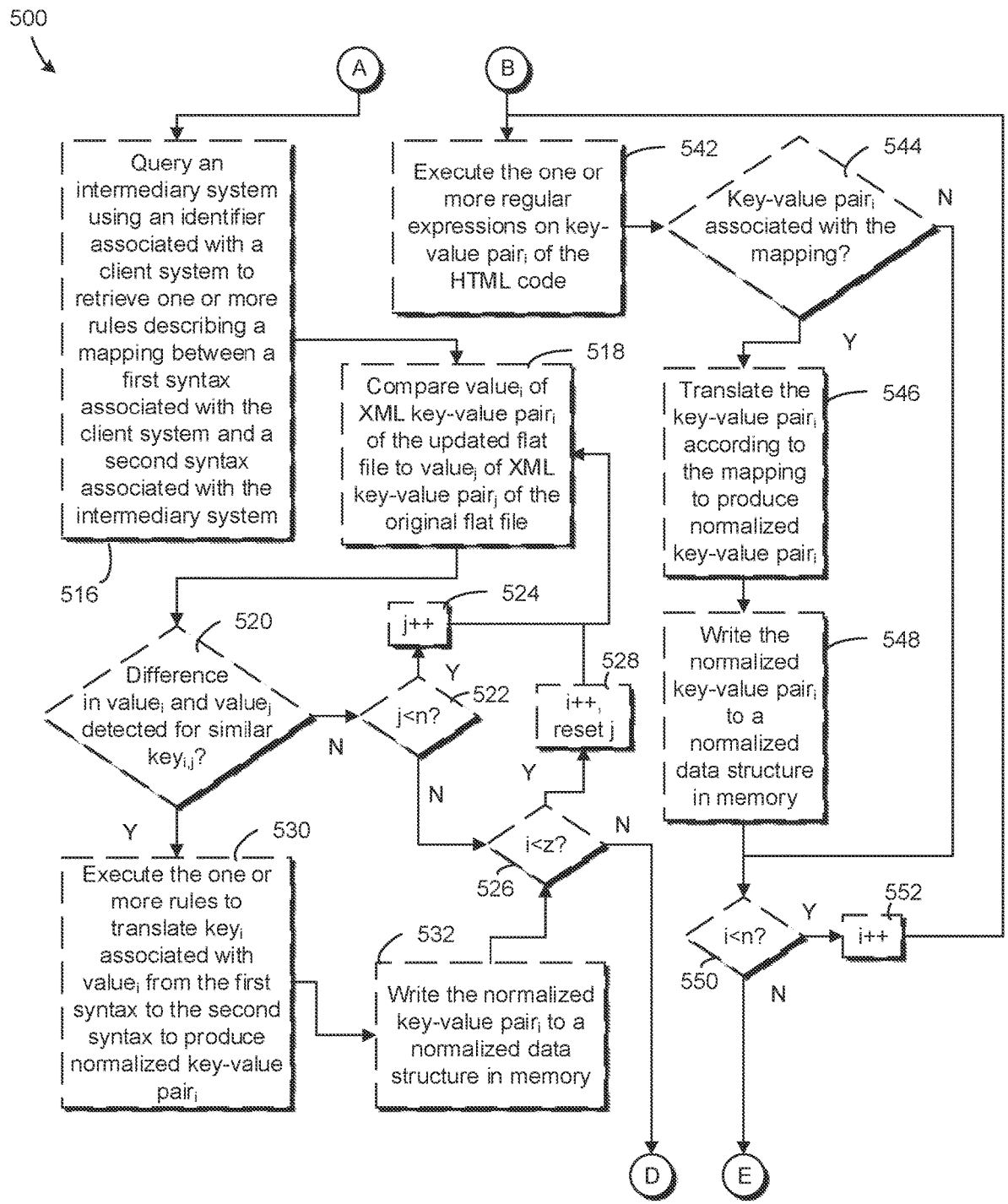
Figure 5C:
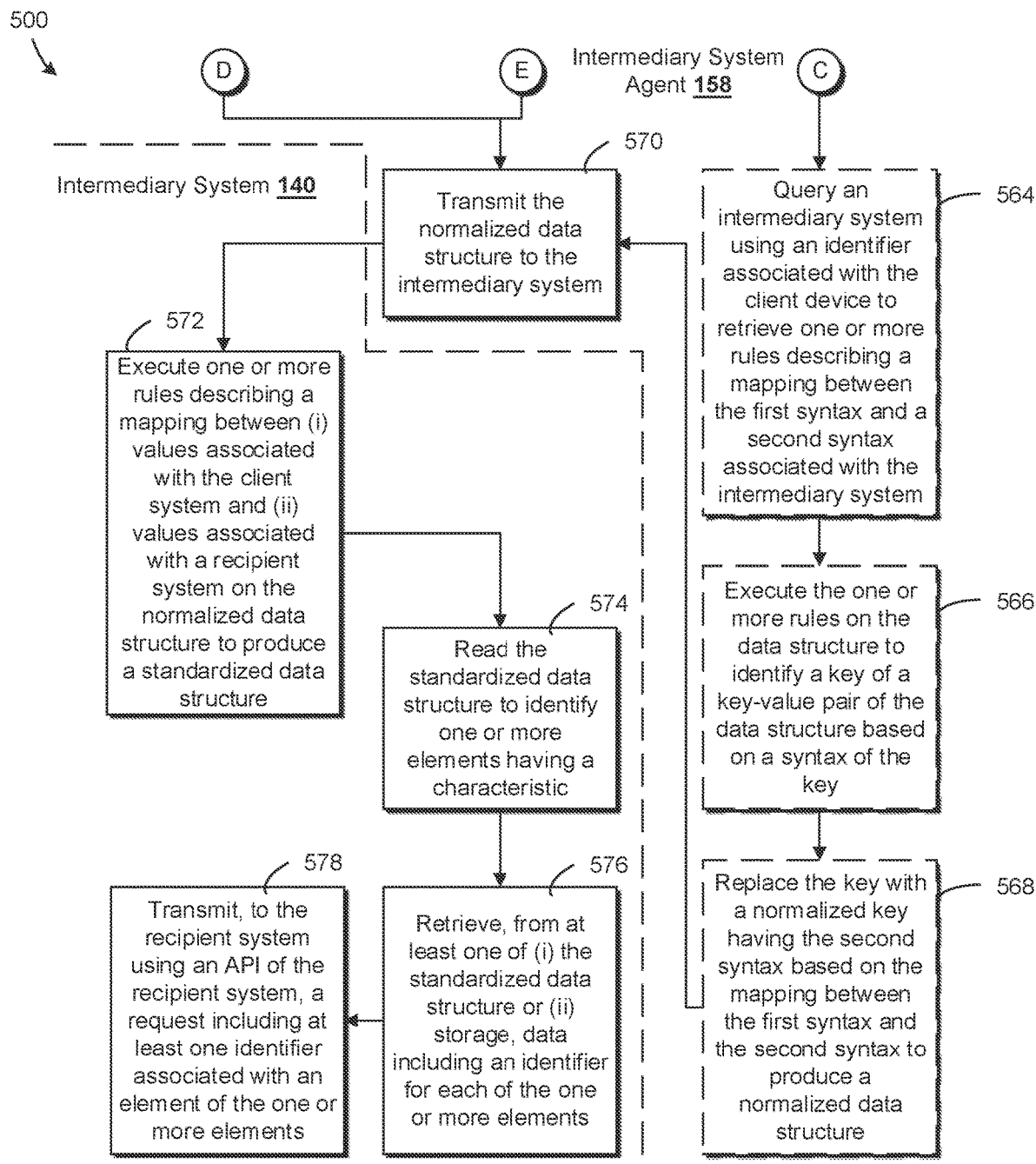

Referring now to FIGS. 5A-5C, method 500 for integrating heterogeneous computing system is shown, according to an implementation. In various implementations, intermediary system agent 158 and/or intermediary system 140 perform method 500.

At step 502, intermediary system agent 158 may monitor the operation of a program executed on client device 130 by at least one of (i) reading execution calls associated with the program, (ii) capturing a plurality of packets associated with the program, or (iii) parsing HTML code of a webpage to identify one or more key-value pairs associated with the fields of the webpage. In various implementations, the program includes a PiMS. In various implementations, the packets are associated with network communication between client device 130 and client computing system 120.

At step 504, intermediary system agent 158 may determine whether a read/write operation is detected based on the monitoring performed in step 502. For example, intermediary system agent 158 may identify a read/write request from the execution calls monitored in step 502. As another example, intermediary system agent 158 may identify a flat file identifier and/or a read/write request associated with the flat file identifier from the plurality of packets captured in step 502. As yet another example, intermediary system agent 158 may identify an HTML PUT request associated with the webpage monitored in step 502. In some implementations, step 504 includes detecting an event such as an interaction on client device 130. For example, intermediary system agent 158 may detect that a user has selected a checkout button on an interface displayed by client device 130. In various implementations, the read/write operation is associated with client device 130.

If intermediary system agent 158 does not detect a read/write operation (e.g., step 504 is no), then intermediary system agent 158 may repeat step 502. For example, intermediary system agent 158 may continue to monitor the operation of a program executed on client device 130 until a read/write operation is detected. If intermediary system agent 158 detects a read/write operation (e.g., step 504 is yes), then intermediary system agent 158 may perform at least one of step 510, step 540, and/or step 560. The specific step may depend on a type of read/write operation detected and/or the means by which the read/write operation was detected. For example, intermediary system agent 158 may detect a read/write operation while reading execution calls associated with a PiMS and may perform step 560 in response. As another example, intermediary system agent 158 may detect a read/write operation by parsing a plurality of packets to identify a URI associated with the read/write operation and perform step 510 in response. As yet another example, intermediary system agent 158 may detect a read/write operation by parsing HTML code of a webpage to extract key-value pairs associated with the read/write operation and perform step 540 in response. In various implementations, step 510, step 540, and/or step 560 are performed in sequence. For example, intermediary system agent 158 may check for a URI and in response to not identifying a URI intermediary system agent 158 may attempt to identify a memory location based on reading execution calls associated with a program. Additionally or alternatively, step 510, step 540, and/or step 560 are performed in parallel.

At step 510, intermediary system agent 158 may parse the plurality of packets to identify a URI of an updated flat file modified according to the read/write operation. For example, intermediary system agent 158 may reconstruct an instruction string using the plurality of packets and may parse the instruction string to identify a URI referenced by a write operation of the instruction string. At step 512, intermediary system agent 158 may query client system 110 using the URI of the updated flat file to retrieve the updated flat file. For example, intermediary system agent 158 may generate a read request formatted according to a read/write request identified from the plurality of packets and may query client database 122 using the read request including the URI. In some implementations, step 512 includes querying a SQL server using an identifier of a file (e.g., the URI, etc.).

At step 514, intermediary system agent 158 may query intermediary system 140 using a URI of an original flat file to retrieve the original flat file. In various implementations, intermediary system agent 158 determines the URI of the original flat file based on an identity of client system 110. At step 516, intermediary system agent 158 may query intermediary system 158 using an identifier associated with client system 110 to retrieve one or more rules describing a mapping between a first syntax associated with client system 110 and a second syntax associated with intermediary system 140. Additionally or alternatively, the second syntax may be associated with recipient system 160. In some implementations, intermediary system agent 158 determines the identifier associated with client system 110 based on a lookup table. In some implementations, intermediary system agent 158 determines the identifier dynamically based on analysis of a syntax of client system 110.

At step 518, intermediary system agent 158 may compare a value of an XML key-value pair of the updated flat file to another value of another XML key-value pair of the original file. For example, intermediary system agent 158 may test for equivalence between the value and the another value. As another example, intermediary system agent 158 may perform fuzzy matching on the value and the another value. At step 520 intermediary system agent 158 may determine if a difference between the value and the another value exists for a similar key (e.g., based on the comparison, etc.). For example, intermediary system agent 158 may compare a first row value associated with a first header value from a first data structure to a second row value from a second data structure, the second row value associated with a second header value that is the same as the first header value.

If a difference is detected (e.g., step 520 is yes), then intermediary system agent 158 may execute the one or more rules to translate a key associated with the value from the first syntax to the second syntax to produce a normalized key-value pair (e.g., step 530). For example, intermediary system agent 158 may modify and/or replace a row/column header as described above. At step 532, intermediary system agent 158 may write the normalized key-value pair to a normalized data structure in memory. In some implementations, step 532 includes overwriting the original key.

If a difference is not detected (e.g., step 520 is no), then intermediary system agent 158 may iterate through elements of the updated flat file and the original flat file (e.g., steps 522-528, etc.). For example, intermediary system agent 158 may piecewise compare each element in the updated flat file to each element in the original flat file to identify elements that correspond to similar headers and have changed and translate the identified elements from the first syntax to the second syntax.

At step 540, intermediary system agent 158 may query intermediary system 140 using an identifier associated with client system 110 to retrieve one or more regular expressions describing a mapping between (i) a first syntax and first set of key-value pairs associated with client system 110 and (ii) a second syntax and second set of key-value pairs associated with intermediary system 140. At step 542, intermediary system agent 158 may execute the one or more regular expressions on a key value pair of the HTML code. At step 544, intermediary system agent 158 may determine whether the key value pair is associated with the mapping (e.g., based on the execution of the one or more regular expressions, etc.).

If the key-value pair is associated with the mapping (e.g., step 544 is yes), then intermediary system agent 158 may translate the key-value pair according to the mapping to produce a normalized key-value pair (e.g., step 546). At step 548, intermediary system agent 158 may write the normalized key-value pair to a normalized data structure in memory.

If the key-value pair is not associated with the mapping (e.g., step 544 is no), then intermediary system agent 158 may iterate through the key-value pairs (e.g., steps 550-552, etc.). For example, intermediary system agent 158 may execute the one or more regular expressions on each key-value pair of the HTML code to identify key-value pairs that are associated with the mapping and translate the identified key-value pairs according to the mapping.

At step 560, intermediary system agent 158 may identify, from the execution calls, a location in memory associated with the read/write operation. For example, intermediary system agent 158 may parse the execution calls to identify a memory address corresponding to the read/write operation. At step 562, intermediary system agent 158 may fetch, from the location in memory, a data structure having a first syntax. For example, step 562 may include fetching a table identifying a number of transactions. In various implementations, step 562 includes fetching the data structure from client system 110 such as from client device 130.

At step 564, intermediary system agent 158 may query intermediary system 140 using an identifier associated with client device 130 to retrieve one or more rules describing a mapping between the first syntax and a second syntax associated with intermediary system 140. For example, the one or more rules may include IF-THEN statements for identifying a particular string using a regular expression statement and replacing the particular string with a defined replacement. At step 566, intermediary system agent 158 may execute the one or more rules on the data structure to identify a key of a key-value pair of the data structure based on a syntax of the key. For example, intermediary system agent 158 may identify a key defined as "identifier no." based on a one or more characters of the key (e.g., a space character, a period, etc.). Additionally or alternatively, step 566 may include identifying a key based on a value of the key (e.g., the string defining the key, etc.).

At step 568, intermediary system agent 158 may replace the key with a normalized key having the second syntax based on the mapping between the first syntax and the second syntax to produce a normalized data structure. For example, intermediary system agent 158 may replace a first key defined as "identifier no." with a second key defined as "ID #."

At step 570, intermediary system agent 158 may transmit the normalized data structure to intermediary system 140. In some implementations, step 570 includes transmitting only the elements of the data structure that were determined to have changed (e.g., a table element that was modified as part of the read/write operation). Additionally or alternatively, step 570 may include transmitting additional elements such as the entire data structure (e.g., the normalized data structure, etc.). In various implementations, step 570 includes receiving, by intermediary system 140, the normalized data structure from intermediary system agent 158.

At step 572, intermediary system 140 may execute one or more rules describing a mapping between (i) values associated with client system 110 and (ii) values associated with recipient system 160 on the normalized data structure to produce a standardized data structure. For example, intermediary system 140 may parse the normalized data structure using one or more regular expressions to identify elements in the normalized data structure having an identifier from a first set of identifiers associated with client system 110 and replace the identifier with a new identifier from a second set of identifiers associated with recipient system 160. As another example, step 572 may include replacing a first identifier defined as "medication no. 2049290" with a second identifier defined as "#40-A-20290."

At step 574, intermediary system 140 may read the standardized data structure to identify one or more elements having a characteristic. In some implementations, the characteristic is a fixed characteristics such as a data flag in a data array. Additionally or alternatively, the characteristic may be a dynamic characteristic such as a certain combination of parameters that meet a threshold. In some implementations, step 574 includes identifying one or more transactions having a "ship to home" flag.

At step 576, intermediary system 140 may retrieve, from at least one of (i) the standardized data structure, or (ii) storage, data including an identifier for each of the one or more elements. For example, intermediary system 140 may identify an identifier from a key-value pair associated with an element of the one or more elements. In various implementations, each of the one or more elements corresponds to a transaction. For example, each element may correspond to a row in a data structure representing a number of transactions for a business and each column in the row may correspond to details regarding the specific transaction (e.g., a number and quantity of goods/services sold, shipping details, customer information, prescription information, etc.). In various implementations, step 576 includes retrieving the data from at least one of client database 122 (e.g., via intermediary system agent 158, etc.) and/or intermediary system database 156. In various implementations, the identifier includes a product identifier. For example, the identifier may be a product identifier used to identify a product by recipient system 160.

At step 578, intermediary system 140 may transmit, to recipient system 160 using API 162, a request including at least one identifier associated with an element of the one or more elements. For example, intermediary system 140 may transmit a purchase/order request to recipient system 160 for at least one product identified by the at least one identifier. In various implementations, step 578 includes transmitting auxiliary/context information. For example, intermediary system 140 may transmit payment information, shipping information, prescription information, and/or the like. In some implementations, step 578 includes receiving an ACK from recipient system 160.

It should be understood that the term "schema" as used herein refers to a model for representing/organizing information. For example, a schema may describe the bounds that various parameters may take and may describe how information is structured such as acceptable data types, file structures, field names, recognized parameter values, and/or syntax.

According to various implementations, the processes that effectuate illustrative implementations that are described herein can be achieved by a computing system (e.g., client device 130, intermediary system 140, etc.) in response to a processor executing an arrangement of instructions contained in memory. Such instructions can be read into the memory from another computer-readable medium, such as a storage device. Execution of the arrangement of instructions contained in the memory causes the computing system to perform the illustrative processes described herein. One or more processors in a multi-processing arrangement may also be employed to execute the instructions contained in the memory. In alternative implementations, hard-wired circuitry may be used in place of or in combination with software instructions to implement illustrative implementations. Thus, implementations are not limited to any specific combination of hardware circuitry and software.

Although an example processing system has been described in FIG. 1, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal (e.g., a machine-generated electrical, optical, or electromagnetic signal, etc.) that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing apparatus," "computing system," or "computing device" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Circuit as utilized herein, may be implemented using hardware circuitry (e.g., FPGAs, ASICs, etc.), software (instructions stored on one or more computer readable storage media and executable by one or more processors), or any combination thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While implementations of the above discussed systems and methods may be applied to integrate any type and form of heterogeneous computing systems in any context, it may be helpful to briefly discuss some non-limiting example implementations of how these systems and methods may be used.

In the veterinary medicine industry, service providers such as pet stores, clinics, hospitals, etc. typically have a limited supply of prescription and/or non-prescription pet products on hand at any time for various reasons including capital expense, expiration or degradation of product over time, etc. These products may include consumables such as prescription and non-prescription pet food, pharmaceuticals, or treats, as well as non-consumable goods such as collars, leashes, pet trackers, electronic fences, etc. Rather than have a large supply in stock, providers typically rely on product manufacturers and distribution companies to periodically provide restocking shipments of requested products, ideally prior to the stock running out. Manufacturers and distributors may set up their own software systems or networks for inventory management, so that stock levels may be monitored and shipments scheduled. Examples of such systems include the eVetPractice, ImproMed, or AVImark veterinary software systems manufactured by Covetrus, of Melville, New York; the Cornerstone practice management software manufactured by Idexx Laboratories, Inc. of Westbrook, Maine; the NaVetor software system manufactured by Patterson Companies, Inc. of Mendota Heights, Minnesota; and others.

Additionally, many manufacturers or distributors offer direct-to-consumer or "at home" delivery services, e.g., for products that may be out of stock or not routinely stocked at a clinic; for client convenience to avoid requiring the client to visit the clinic; etc. Clients may order the products directly, e.g. via a website of the manufacturer or distributor or other third party.

However, typical implementations of direct-to-consumer sales systems are not integrated with service provider inventory and sales systems. As a result, a client may visit a clinic and receive a prescription or recommendation for a product but be unable to purchase the product on-site if it is not stocked, and must instead perform a completely separate shopping, payment, and checkout process via the direct-to-consumer system website. This separate process may frustrate users, and service providers may not be incentivized to direct clients to the direct-to-consumer purchase systems, reducing their adoption. This may result in distribution inefficiencies, wasted trips by clients to providers to purchase goods that could be directly ordered, etc.

Instead, implementations of the systems and methods discussed herein may automatically integrate discrete clinic or provider inventory systems and direct-to-consumer purchase systems to provide a combine virtual distribution system that provides both local inventory management and on-site sales and direct-to-consumer shipping of out-of-stock product, without the need for any secondary shopping process or experience, and without requiring sales or distribution system software manufacturers to modify their software or provide explicit APIs. Item selection and payment transactions may be performed identically through the virtual distribution system for items purchased locally or automatically delivered to the client, e.g. to an address associated with the client within the clinic's medical record database.

Implementations of the virtual distribution system may interface with veterinary practice PiMS databases regardless of PiMS developer or standard utilized, via an extraction, translation, and loading (ETL) service executed by a computing device with access to the client's PiMS database (e.g. a local client device). The ETL service may extract patient, client, and/or inventory data or any other such data from a PiMS database of the service provider, using any of the several extraction methods discussed above or a combination of these methods. The extracted data maybe translated into a standardized format that is agnostic to the original PiMS database format or developer, with a mapping of data from the PiMS-specific formatting into the standardized format. Mapped data may include syntax, database fields, product and/or client identifiers, or any other such data. For example, a single product type or SKU may be identified via different product codes in different manufacturer's PiMS systems. Mappings may be generated to associate each of these PiMS-specific identifiers with a single standardized unique identifier, allowing any record or request to be identified as corresponding to the product regardless of its syntax or schema. Service provider or clinic-specific mappings may be separately maintained, allowing for provider customization of their local database without requiring modification of the system or other providers' data (e.g. adding additional data fields, adding custom products such as locally manufactured goods, etc.).

Mapped or translated transaction data may be provided to a server device and processed to identify virtual distribution shipping requests, and generate product selection and shipping instructions for a warehouse or other distributor, referred to as a virtual distributor, including client names and addresses, clinic or provider identification, product type, product size or amount, pet identification, prescription number or refill number, and/or any other type and form of information. Once processed, the instructions may be provided to the virtual distributor for direct shipping of the requested goods. In some implementations, the system may retain a status or state for requested transactions, which may be dynamically updated responsive to communications from the virtual distributor (e.g. order received, product shipped, etc.)

Accordingly, implementations of the systems and methods discussed herein provide for easy and efficient virtual distribution, or a single transaction process for receiving veterinary or other goods regardless of whether they are locally available or in-stock or remotely available and shipped to the purchaser. Implementations of these systems also enable distributors to automatically interface with and receive direct shipping orders from clients using different PiMS systems with different product identification systems and syntax requests, without requiring human intervention or direct control.

The above example is not intended to limit the scope or field of use of the claimed invention, and implementations of the systems and methods discussed herein may be used to provide virtual distribution and integration of heterogeneous computing systems in any industry.

What is claimed is:

1. A method for integrating heterogeneous computing systems, comprising:
    identifying, by an endpoint system agent operating on a client device, a read/write operation associated with the client device based on monitoring an operation of a program executed on the client device, wherein the endpoint system agent includes a web browser plugin;
    extracting, by the endpoint system agent from at least one of the client device or a client system in communication with the client device, data having a first syntax associated with the client system in response to identifying the read/write operation, wherein extracting the data includes extracting, by the web browser plugin, a value associated with an input from a product field of a webpage;
    receiving, by the endpoint system agent from an endpoint system, one or more rules describing a mapping between the first syntax associated with the client system and a second syntax associated with the endpoint system;
    executing, by the endpoint system agent, the one or more rules to modify the data to conform to the second syntax associated with the endpoint system to produce mapped data; and
    transmitting, by the endpoint system agent, the mapped data to the endpoint system.

2. The method of claim 1, wherein executing the one or more rules includes:
    identifying a key of a key-value pair in a data array of the data based on a syntax of the key as specified by the one or more rules; and
    replacing the key with a normalized key having the second syntax based on the mapping between the first syntax and the second syntax described by the one or more rules.

3. The method of claim 2, wherein executing the one or more rules further includes executing a regular expression to identify the key of the key-value pair in the data array.

4. The method of claim 1, wherein extracting the data includes:
    parsing hypertext markup language (HTML) code of the webpage to identify a key-value pair associated with the product field; and
    retrieving an identifier from the key-value pair associated with the product field.

5. A method for integrating heterogeneous computing systems, comprising:
    identifying, by an endpoint system agent operating on a client device, a read/write operation associated with the client device based on monitoring an operation of a program executed on the client device, wherein identifying the read/write operation based on monitoring the operation of the program includes capturing a plurality of packets and identifying from the plurality of packets an updated flat file modified according to the read/write operation;
    extracting, by the endpoint system agent from at least one of the client device or a client system in communication with the client device, data having a first syntax associated with the client system in response to identifying the read/write operation, wherein extracting the data includes (i) reading the updated flat file stored in the client system, (ii) comparing the updated flat file to an original flat file to identify one or more changes to the updated flat file, and (iii) retrieving data associated with the one or more changes from the updated flat file stored in the client system;

receiving, by the endpoint system agent from an endpoint system, one or more rules describing a mapping between the first syntax associated with the client system and a second syntax associated with the endpoint system;

executing, by the endpoint system agent, the one or more rules to modify the data to conform to the second syntax associated with the endpoint system to produce mapped data; and transmitting, by the endpoint system agent, the mapped data to the endpoint system.

6. The method of claim 5, wherein capturing the plurality of packets and identifying the updated flat file includes parsing a packet of the plurality of packets to identify a uniform resource identifier (URI) of the updated flat file, wherein reading the updated flat file includes querying, by the endpoint system agent, the client system using the URI of the updated flat file, and wherein comparing the updated flat file to the original flat file includes parsing XML, to identify a difference in a value of a key-value pair between the updated flat file and the original flat file.

7. The method of claim 6, further comprising receiving, by the endpoint system agent from the endpoint system, the original flat file.

8. One or more non-transitory computer-readable storage mediums having instructions stored thereon that, when executed by one or more processors, cause the one or more processors to:

identify a read/write operation associated with a client device based on monitoring an operation of a program executed on the client device;

extract, from at least one of the client device or a client system in communication with the client device, data having a first syntax associated with the client system in response to identifying the read/write operation, wherein the instructions cause the one or more processors to extract the data by extracting, using a web browser plugin, a value associated with an input from a product field of a webpage;

receive, from an endpoint system, one or more rules describing a mapping between the first syntax associated with the client system and a second syntax associated with the endpoint system;

execute the one or more rules to modify the data to conform to the second syntax associated with the endpoint system to produce mapped data; and transmit the mapped data to the endpoint system.

9. The one or more non-transitory computer-readable storage mediums of claim 8, wherein executing the one or more rules includes:

identifying a key of a key-value pair in a data array of the data based on a syntax of the key as specified by the one or more rules; and replacing the key with a normalized key having the second syntax based on the mapping between the first syntax and the second syntax described by the one or more rules.

10. The one or more non-transitory computer-readable storage mediums of claim 9, wherein executing the one or more rules further includes executing a regular expression to identify the key of the key-value pair in the data array.

11. The one or more non-transitory computer-readable storage mediums of claim 8, wherein identifying the read/write operation based on monitoring the operation of the program includes capturing a plurality of packets and identifying from the plurality of packets an updated flat file modified according to the read/write operation, and wherein extracting the data includes (i) reading the updated flat file stored in the client system, (ii) comparing the updated flat file to an original flat file to identify one or more changes to the updated flat file, and (iii) retrieving data associated with the one or more changes from the updated flat file stored in the client system.

12. The one or more non-transitory computer-readable storage mediums of claim 11, wherein capturing the plurality of packets and identifying the updated flat file includes parsing a packet of the plurality of packets to identify a uniform resource identifier (URI) of the updated flat file, wherein reading the updated flat file includes querying the client system using the URI of the updated flat file, and wherein comparing the updated flat file to the original flat file includes parsing XML, to identify a difference in a value of a key-value pair between the updated flat file and the original flat file.

13. The one or more non-transitory computer-readable storage mediums of claim 12, wherein the instructions further cause the one or more processors to receive, from the endpoint system, the original flat file.

14. The one or more non-transitory computer-readable storage mediums of claim 8, wherein extracting the data includes:

parsing HTML of the webpage to identify a key-value pair associated with the product field; and retrieving an identifier from the key-value pair associated with the product field.

15. A client device for integrating heterogeneous computing systems, the client device comprising a processor and memory, the memory having instructions stored thereon that, when executed by the processor, cause the processor to:

identify an interaction with a client system based on monitoring a network connection to the client system;

extract, from the client system, data having a first syntax associated with the client system in response to identifying the interaction, wherein the instructions cause the processor to extract the data by extracting, using a web browser plugin, a value associated with an input from a product field of a webpage;

receive, from an intermediary system, one or more rules describing a mapping between the first syntax associated with the client system and a second syntax associated with a recipient system;

execute the one or more rules to modify the data to conform to the second syntax associated with the recipient system to produce mapped data; and transmit the mapped data to the intermediary system.

16. The client device of claim 15, wherein executing the one or more rules includes:

identifying a key of a key-value pair in a data array of the data based on a syntax of the key as specified by the one or more rules; and replacing the key with a normalized key having the second syntax based on the mapping between the first syntax and the second syntax described by the one or more rules.

17. The client device of claim 16, wherein executing the one or more rules further includes executing a regular expression to identify the key of the key-value pair in the data array.

18. The client device of claim 15, wherein identifying the interaction based on monitoring the network connection includes capturing a plurality of packets and identifying from the plurality of packets an updated flat file modified according to the interaction, and wherein extracting the data includes (i) reading the updated flat file stored in the client system, (ii) comparing the updated flat file to an original flat file to identify one or more changes to the updated flat file, and (iii) retrieving data associated with the one or more changes from the updated flat file stored in the client system.

\* \* \* \* \*